United States Patent [19] [11] 4,064,795
Ackerman [45] Dec. 27, 1977

[54] AUTOMATIC BYPASS COFFEE BREWER

[76] Inventor: Maria Elena Perdomo Ackerman, Rte. 3, Box 373D, Kinston, N.C. 28501

[21] Appl. No.: 691,442

[22] Filed: June 1, 1976

[51] Int. Cl.² ............................................. A41J 31/00
[52] U.S. Cl. ......................................... 99/304; 99/305
[58] Field of Search ................. 99/304, 305, 306, 307, 99/299, 300, 282, 283

[56] References Cited

U.S. PATENT DOCUMENTS

| Re. 25,663 | 10/1964 | Bunn | 99/305 X |
| 2,227,540 | 1/1941 | Fry | 99/306 |
| 3,181,732 | 5/1965 | Immermann | 99/307 X |
| 3,336,856 | 8/1967 | Martin | 99/300 X |
| 3,520,247 | 7/1970 | Hester | 99/305 X |

Primary Examiner—Edward J. McCarthy
Attorney, Agent, or Firm—Berman, Aisenberg & Platt

[57] ABSTRACT

An automatic coffee brewer including a water heating tank, a funnel-like holder for ground coffee, a siphon device for dispensing a predetermined amount of hot water from the tank through the grounds holder, and a bypass valve for directing approximately 40% of the hot water around the grounds and directly to an unheated, thermo-insulated beaker so that the resultant brew has extracted about 60% of the soluble solids in the coffee to yield a better tasting brew free of bitterness and astringency. The use of the thermo-insulated beaker enables the brewed coffee to be kept hot without further heating for several hours and avoids bitterness derived by continuous heating.

9 Claims, 8 Drawing Figures

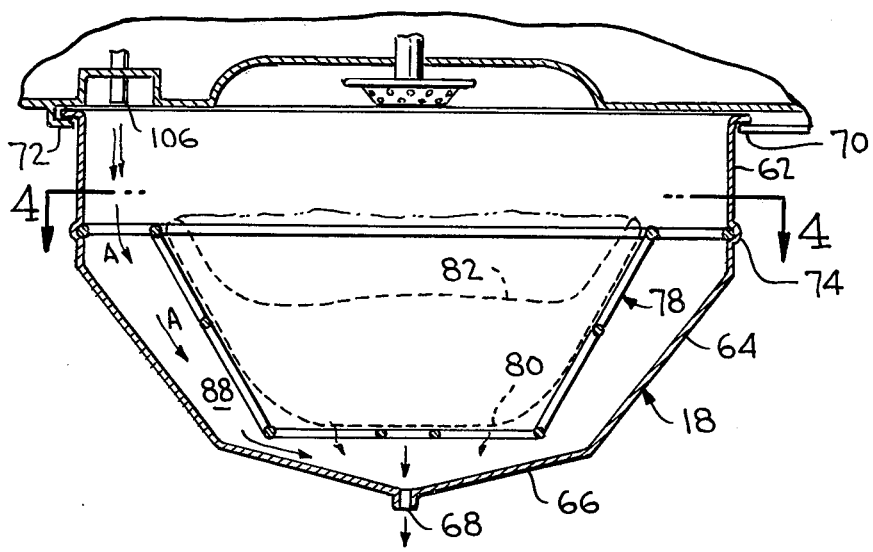
FIG. 3
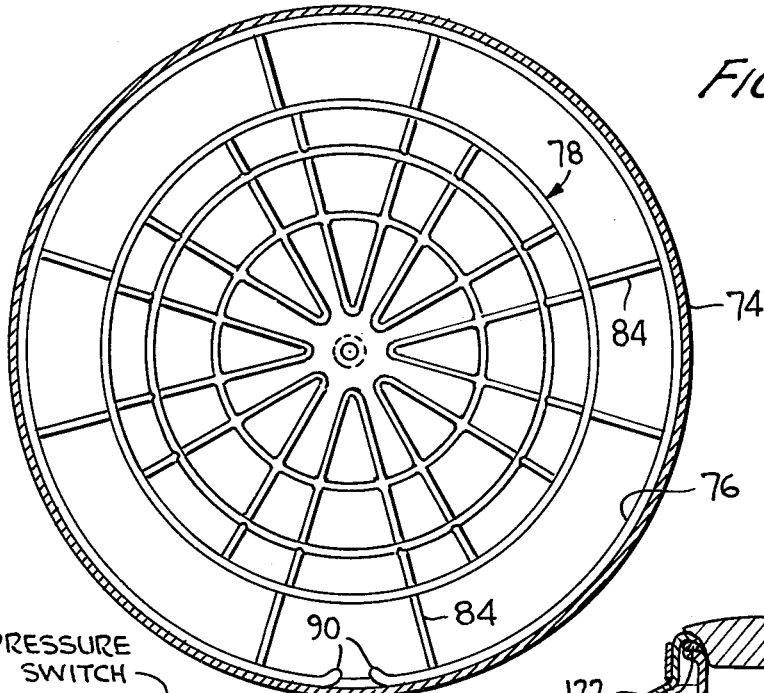
FIG. 4
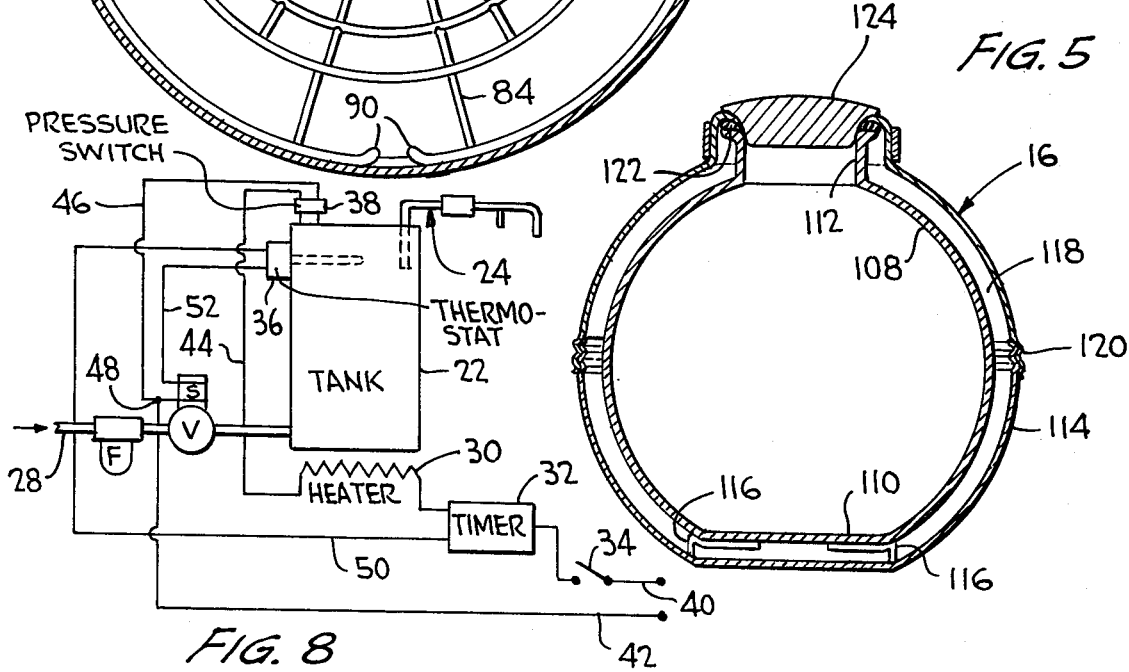
FIG. 5
FIG. 8

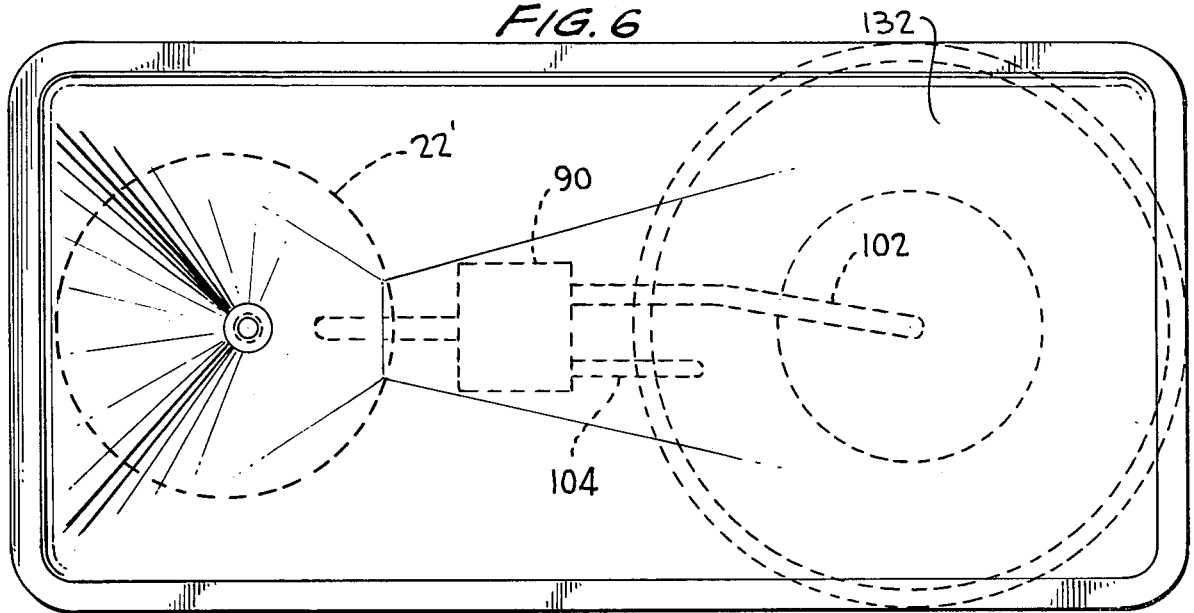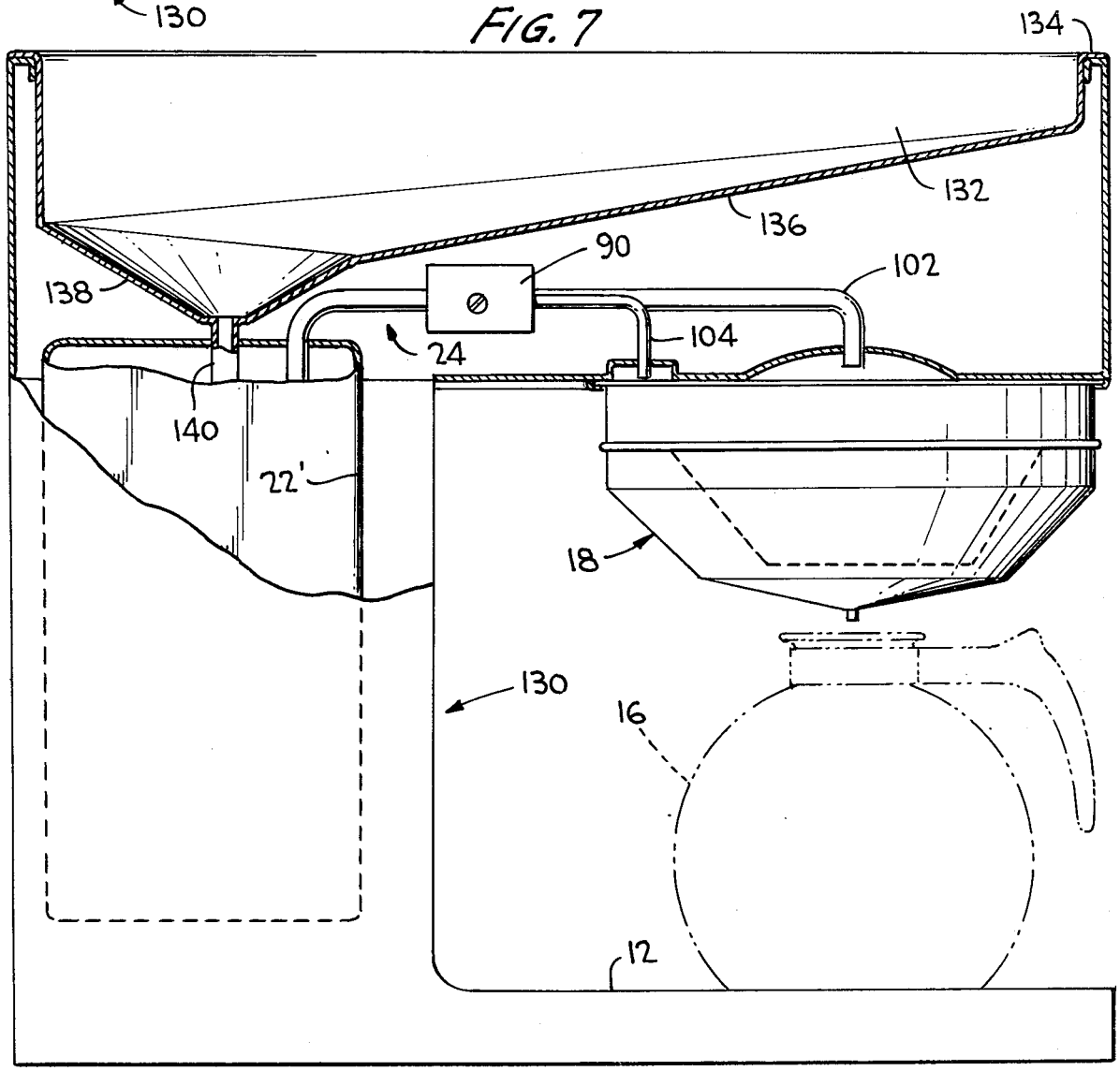

AUTOMATIC BYPASS COFFEE BREWER

BACKGROUND OF THE INVENTION

The quality and taste with brewed coffee depends upon numerous factors such as the price or quality of the beans, the control exercised in roasting the beans, the proportions of the particles of different size obtained in grinding the roasted beans for brewing, freshness of use after grinding, and the extraction of the correct amount of soluble solids from the coffee during brewing.

Many different automatic coffee brewers have been designed for brewing and dispensing coffee in wide variety of quantities varying from single cup, ten cup (50 oz.), to one gallon and as large as ten gallon sizes. These are intended for use in homes, restaurants, factories and the like. Although these operate in a generally satisfactory manner, they are subject to the defects and disadvantages of passing all of the measured amounts of hot water through the coffee grounds and continuing to heat the coffee after brewing is completed, resulting in coffee which tastes astringent and bitter initially and worsens in taste with time of heating after brewing.

In "Facts About Coffee" published by the Pan-American Coffee Bureau it is stated, referring to brewing 1 pound of coffee:

If the coffee and water remains in contact long enough, about 5½ ozs. of soluble Materials will be removed. However, complete extraction is extremely undesirable; it releases materials that make the beverage taste astringent and bitter. Such beverage is totally unacceptable. Extraction should be completed when only the first 2.9 to 3.5 ozs. of soluble materials have been removed from the grounds, as these will contain all of the desired flavor, aroma and color that the coffee has to give. When extraction is extended beyond 3.5 ozs. only bitter materials are withdrawn, and the coffee becomes astringent and unpalatable.

Publication No. 61, 1970 entitled "The Direct Reading Coffee Hydrometer" contains a chart labeled FIG. 4 which shows that after considerable and lengthy testing, ideal coffee may be brewed using anywhere from 1.85 to 2.60 gallons of water per pound of coffee. However, with any ratio within this range the brew may be strong, bitter, underdeveloped or weak, unless the time of contact with the water with the coffee is controlled to yield from 1.15 to 1.35% solids in solution extracted from the coffee which is equivalent to approximately 2.9 to 3.5 ozs.

In a pound of coffee, 2.9 ozs. represents 53% of the 5.5 ozs. capable of complete extraction. 3.5 ozs. represents 64% of the 5.5 ozs. (complete extraction). Therefore to obtain ideal coffee brew, between 53 and 64% only of the hot water should be allowed to contact the coffee grounds, and between 36 and 47% of the hot water should bypass the coffee grounds. Confirming this recommendation, the first cited publication for manually poured, large urns states, "If all of the water cannot be passed through the grounds within the prescribed brewing time" (which is between 4 and 6 minutes), "it may be necessary to place some of the water (up to 40%) in the bottom of the urn before brewing. This prevents over-extraction and bitterness."

SUMMARY OF THE INVENTION

The present invention relates to automatic coffee brewers and has for its primary purpose the provision of a brewer which overcomes the defects and disadvantages of conventional brewers as briefly outlined above.

It is a further important object of the invention to provide an improved automatic coffee brewer which passes about 60% of the heated water through coffee grounds for brewing, bypasses the remaining 40%, and both the brewed liquid and the bypassed liquid in hot condition being received in a thermo-insulated jug where they are retained hot for considerable period of time without further heating.

It is another important object of the invention to provide an automatic coffee brewer which makes ideal coffee brew of excellent taste, which brew does not become bitter with passage of time since it is kept hot in a thermos beaker so as to retain its heat and good taste for a number of hours.

It is still another object of the invention to provide an improved automatic coffee brewing machine which is of simple construction and inexpensive to fabricate and operate, which avoids waste of coffee which is too bitter and the need to throw away such bitter coffee, and which saves the cost of electricity to the user through omission of any electrical heating unit to maintain the brewed coffee warm.

The above objects of the invention are achieved by providing an automatic coffee brewer of more or less conventional structure, but which differs from conventional machines by incorporation of a bypass valve in the line from the water heating tank to the grounds holder, said bypass device serving to direct approximately 40% of the hot water around the grounds and directly to an unheated thermally insulated beaker so that the remaining 60% of the measured quantity of hot water passes through the grounds and extracts only 60% of the soluble solids. No electric heating unit is provided under the coffee receiving beaker, which being of the thermos bottle or thermo-insulating type, serves to retain the brew hot for several hours and avoids bitterness normally derieved by continuous heating for longer than 40 minutes.

BRIEF DESCRIPTION OF THE DRAWINGS

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout several figures, and in which:

FIG. 3 is a fragmentary sectional view taken on line 3—3 of FIG. 2 and showing the container for holding a filter and coffee grounds together with related parts;

FIG. 4 is a sectional view taken along line 4—4 of FIG. 3 and looking in the direction of the arrows;

FIG. 5 is a vertical sectional view centrally through the thermal beaker taken on line 5—5 of FIG. 1;

FIG. 6 is a top plan view of another embodiment of the coffee brewer;

FIG. 7 is a side elevational view of the modified brewer of FIG. 6, partially broken away to show parts in section; and FIG. 8 is a circuit diagram for electrical operation of the embodiment of FIG. 1.

BRIEF DESCRIPTION OF THE PREFERRED EMBODIMENTS

Figure 2:
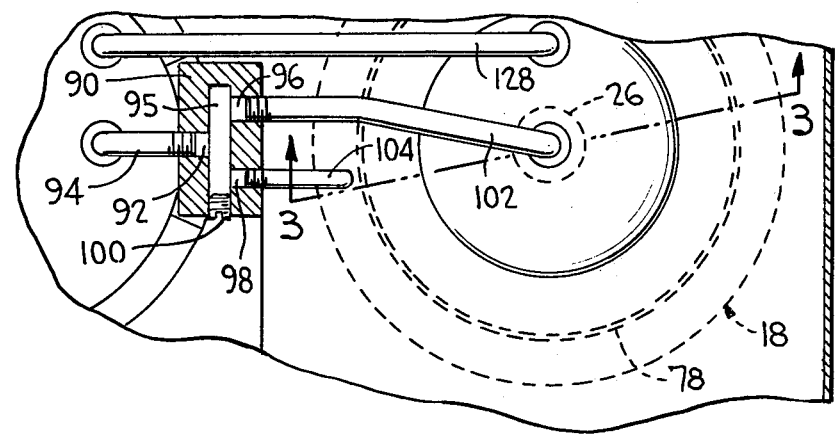
FIG. 2 is a sectional view taken on line 2—2 of FIG. 1 and looking in the direction of the arrows.

One embodiment of the invention will be described below, first with regard to its similarities with conventional coffee brewers and later with regard to the differences in structure and operation involved in the present invention.

The brewer illustrated in FIGS. 1–5 and 8 is similar to that described in U.S. Pat. No. 3,034,417 issued on May 15, 1962 to G. R. Bunn. A reissued patent has been granted under U.S. Pat. No. 25663. Briefly, the present machine 10 similarly comprises a base 12 with feet 14 supporting a beaker 16 on the base under the holder 18 for coffee grounds. Within a housing 20 at one side of the brewer is a tank 22 for receiving cold water and heating the same. A siphon device generally indicated at 24 serves to deliver heated water in measured amount through a spray head 26 to the upper part of the grounds holder 18. Other similar parts of the conventional machine are not shown in structural detail but are indicated diagrammatically in FIG. 8. These parts include a cold water inlet pipe 28 having a filter F, incorporated therein, and controlled by valve V operated by a solonoid S to control the intake of cold water into tank 22. An electric heater 30 under control of a timer 32 heats the water in tank 22, when the Off-On switch 34 is closed. A thermostat head is shown within the upper portion of the tank connected to a thermostat switch 36. Also a conventional pressure switch 38 is utilized. The power lines are shown at 40 and 42. It should be noted that the timer connects the heater and pressure switch in series across the power lines 40, 42 in a circuit including the lines 44, 46 and junction point 48. The timer also connects the thermostat switch 36 and the solonoid S in series through lines 50, 52 to the same junction point 48.

In briefly describing the operation of the automatic coffee making machine 10, it will be assumed that a measured quantity of ground coffee has been placed in the filter in the bottom portion of the holder 18 and that the water pressure of water in tank 22 is sufficient to hold the contacts of the pressure switch 38 closed. Under these assumed conditions the thermostat will function to close and open the contacts of the back of the tank thermostat switch 36 for the purpose of maintaining the water in the water tank at the desired temperature which is at least 195° F. The operating cycle can be initiated by the operator depressing the switch button 34 to start the timer 32. This connects the heater 30 and pressure switch 38 across the power lines 40, 42 and heats the water in the tank. The pressure switch 38 is provided to insure that the tank heater 30 is not energized in the event that the pressure of the water is below a predetermined value. In addition to energization of the heater winding, the water supply valve solenoid S is energized to open the water supply valve V and permit the flow of water to the water tank 22 upon activation of the timer. Upon reaching elevated temperatures above 195° F the pressure in the upper part of the tank 22 will serve to force the hot water through the siphon device 24 to the spray head 26 in a measured amount. The heated water passes through the coffee grounds in the holder 18, extracts the soluble solids therefrom and discharges into the beaker 16. The timer serves to activate the described circuits for a sufficient interval of time to properly heat the water and discharge the measured quantity into the siphon device.

As above described, it should be noted that the present machine is structurally similar to and operates in much the same manner as the machine described in the mentioned Bunn U.S. Pat. No. 3,034,417. For more complete details as to the structure, the elements and their mode of operation, reference may be had to the said Bunn patent. The differences in the structure and mode of operation of the present machine will be described below.

The housing 20 in its upper portion extends to overhang the seated beaker 16 and to form an upper compartment 54 closed by a removable, liftable cover plate 56. All or most of the components of the machine are mounted in the upper compartment 54 for ready accessibility for maintenance purposes. These components such as the timer, water valve, the water valve solenoid, the thermostat switch, the siphon device including the bypass valve are all arranged, in a manner not shown, such that upon lifting cover 56 maintenance functions can be performed readily should they become necessary. The components are supported on a horizontal frame 58, in a manner not shown, except that the water tank 22 is illustrated as having an upper circular flange through which mounting screws 60 fasten the tank to the frame.

The grounds holder 18 is a generally conical, funnel-like member having an upper tubular portion 62, an inwardly, downwardly sloping portion 64 and a similarly but more shallow sloping bottom portion 66 terminating in an outlet opening 68. The upper edge of the holder is outwardly flanged at 70, and this flange permits the holder to be inserted into the machine along the track 72 through an opening at the front of the machine which is at the right of FIG. 3. The holder is, of course, readily removable through the same opening for purpose of removing the coffee grounds or changing them. A circular bead 74 is pressed outwardly in the upper portion 62 of the holder, and this bead serves to seat and hold a split wire ring 76 to which is integrally attached a wire basket, or spider 78 which serves to hold a filter 80 and coffee grounds 82 as diagramatically shown in FIG. 3. The basket 78 is held centrally within the holder 18 with its side and bottom walls spaced from the corresponding walls of the holder by a plurality of radial wires 84 which support the basket from the split ring 76. This spacing generally indicated by reference numeral 88, FIG. 3, provides a volume of space into which hot water may be discharged from the siphon device without contacting the coffee grounds 82 in the basket 78, such discharge proceeding along the arrows A to the holder outlet 68, and from thence to the beaker 16. A fuller explanation of this will appear hereinafter. It should be apparent that by squeezing together the split ends 90 of the ring 76, the basket 78 and its contents may be readily lifted out of the holder 18. By similarly squeezing the ring ends 90 together the basket may be reinserted into the holder with a fresh filter and fresh coffee grounds, the split ends being released to expand the ring 76 into its holding bead 74.

Figure 1:
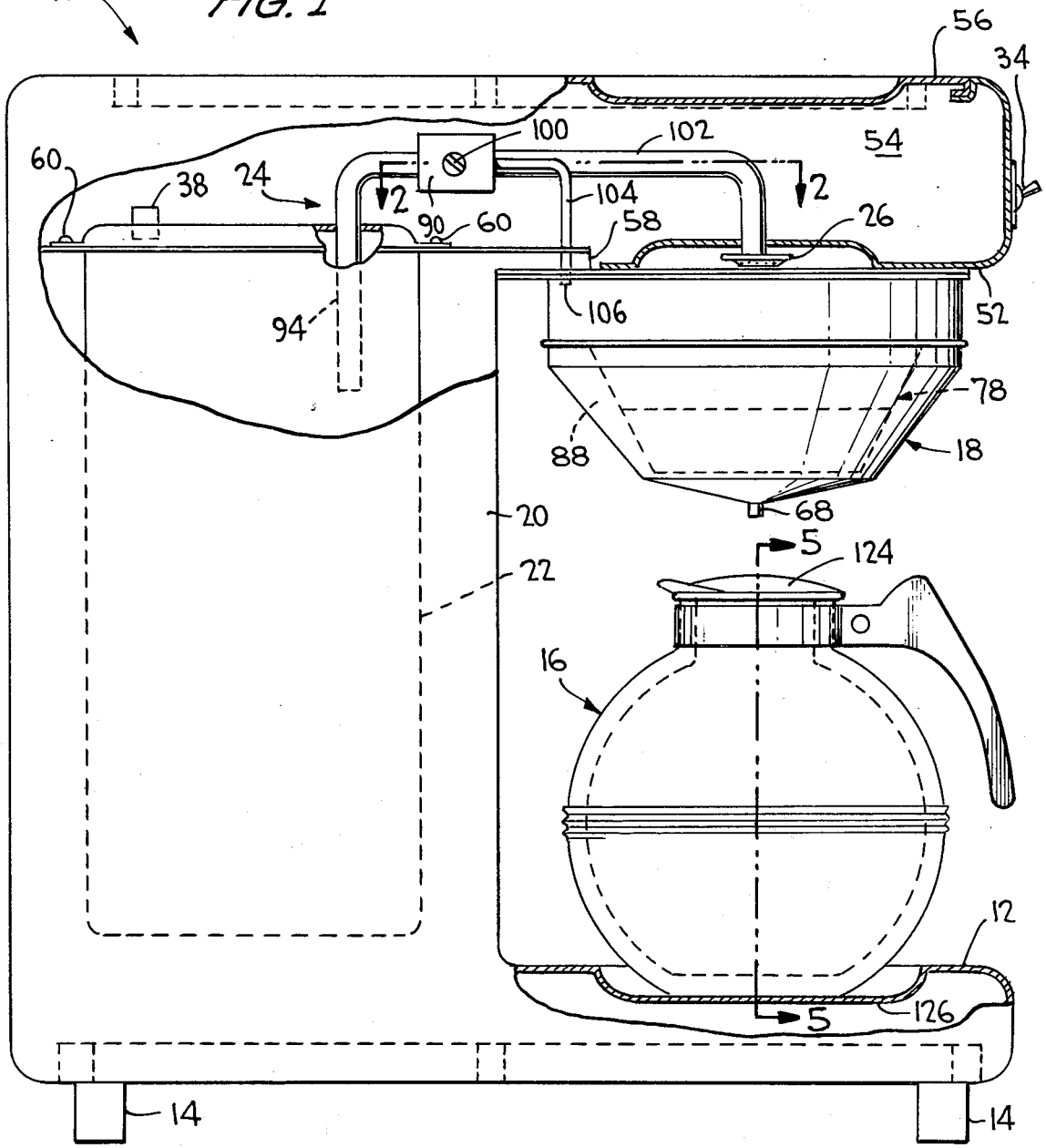
FIG. 1 is an end elevation of an automatic coffee brewer according to the invention in which parts have been broken away to reveal internal details.

The siphon device includes a valve, or stream divider 90, shown in FIGS. 1 and 2 as comprising a retangular block having an inlet passage 92 to which is connected the siphon tube 94 whose lower end terminates in the upper portion of the hot water tank 22 at a level which will permit siphoning of a predetermined amount of hot water from the tank. The valve 90 has a manifold passage 95 which connects the inlet passage 92 to two outlet passages 96 and 98. The manifold passage extends to one end surface of the valve where it is closed by a plug 100 which may be threadedly removed for cleaning the valve. Outlet passage 96 is connected by an outlet tube 102 to the spray head 26. The other outlet passage 98 is connected by tube 104 whose terminal outlet end 106 is disposed immediately above the space 88 in the grounds holder, so that hot water discharged therefrom follows the path of the arrows A in FIG. 3 and avoids contact with the grounds in basket 78. The inlet and outlet passages are so proportioned in area as to divide the hot water stream from siphon tube 94 so that approximately 60% passes through outlet 96 and is ultimately discharged through the spray head 26, while approximately 40% is discharged through tube 104 and passes through space 88 in the holder and outlet 68 directly to beaker 16 without contacting the coffee grounds. To obtain this proportionate division of the stream, the cross-sectional area of inlet 92 should equal the total of the cross-section areas of the outlet passages 96 and 98, and the size of passage 96 should be 50% larger than the size of passage 98. For example, if the inlet 92 is 5/16 inch in diameter, the outlet 96 should be 3/16 inch in diameter and the outlet 98 should be 2/16 inch in diameter. This will divide the hot water stream from the water tank 22 so that 60% is discharged through the spray head 26 and 40% is discharged through outlet 106 of tube 104. If it is desired to change these proportions, it is obviously possible to place a rotatable tube in the manifold passage 94, said tube having openings in its wall, and said tube could be turned to vary the areas of these openings which connect with the outlet passages. From the above description of the valve stream divider 90 it should be apparent that since not all, but only 60% of the measured quantity of the hot water is discharged from the spray head to contact the coffee grounds and seep therethrough to the beaker, it will not remain in contact with the grounds sufficiently long to extract all of the soluble solids in the coffee. Only 60% of the soluble solids will be extracted, and accordingly an ideal coffee will be made of appropriate strength since the additional necessary amount of hot water, i.e., 40%, is delivered to the beaker through space 88 and discharge opening 68.

The beaker 16 as best shown in FIG. 5 comprises an inner spherical vessel 108 having a flat bottom 110 and an upstanding neck 112 at the top. The inner vessel is seated inside an outer vessel 114 on spacers 116 so that its walls are completely spaced from those of the outer vessel leaving a chamber 118 between the walls which may be evacuated, or otherwise insulated, to maintain the contents of the beaker warm. For ease of fabrication the outer vessel may be formed in semi-spherical halves joined at their peripheries by threads 120. The space 118 is sealed by a ring gasket 122 at the neck of the beaker. The beaker is closed by a removable stopper 124 to prevent evaporation of its contents. Of course, when coffee is being brewed in the machine the stopper 124 is removed. At this time the beaker seats in a shallow depression 126, FIG. 1 of the base 12 of the machine. The conventional electrical heating unit normally placed under the beaker is omitted in the inventive machine, so that once the brewed coffee is received in the beaker and the latter closed by stopper 124, the coffee is maintained hot for a long period of time by the thermal insulating characteristic of the double walled and evacuated vessel.

In the automatic machine described as in the embodiment of FIG. 1 there is a vent tube 128, FIG. 2 which connects the space above the spray head 26 to the space at the top of the hot water tank 22. The function of this vent tube is to provide air to the top of the heater tank 22 whose pressure serves to aid the siphoning device 24 to perform its function of discharging a predetermined quantity of hot water.

It will be apparent from the above description, that the present machine is of much simpler construction than conventional machines, such as the referenced Bunn machine. Some components are omitted and yet by provision of the bypass valve which functions to direct 40% of the hot water away from the coffee grounds in holder 18, an ideal coffee drink is brewed.

FIGS. 6 and 7 illustrate a semi-automatic machine suitable for use in the home, and in which the cold water is fed to the hot water tank manually instead of automatically. The machine generally indicated by numeral 130 is structurally identical with the embodiment illustrated in FIG. 1, and operates in the same manner except as described below.

The housing of machine 130 is open at the top and closed by a flat tray having a peripheral flange 134 which seats on the rim of the housing. The bottom 136 of the tray slopes downwardly toward a funnel shaped outlet 138 connected by a pipe 140 to discharge into the heater tank 22′. In using machine 130 the operator pours a measured quantity of cold water into the tray 132 from which it is fed through discharge pipe 140 to the tank 22′. In the tank the water is heated in the same way as described for the embodiment of FIG. 1 and siphoned by the device 24 to pass through the bypass valve 90 and discharge into a holder 18. As described for the previous embodiment, 60% of the hot water passes through outlet 102 and contacts the coffee grounds while approximately 40% of the hot water bypasses the coffee grounds and proceeds directly to the beaker 16.

Although certain specific embodiments of the invention have been shown and described, it is obvious that many modifications thereof are possible. The invention, therefore, is not intended to be restricted to the exact showing of the drawings and description thereof but it is considered to include reasonable and obvious equivalents.

What is claimed is:

1. An automatic coffee brewer comprising: a water tank, means for heating water in said tank, a holder for coffee grounds, a beaker for brewed coffee positioned under said grounds holder, and means for dispensing a predetermined amount of hot water from said tank to said grounds holder, said means including bypass means for conducting a portion of said predetermined amount of hot water directly to said beaker so as to bypass grounds in said holder.

2. An automatic coffee brewer according to claim 1, wherein said bypass means is operative to bypass about 36 to 47% of the hot water away from contact with coffee grounds in the holder.

3. An automatic coffee brewer according to claim 1, wherein said bypass means is operative to bypass about 40% of the hot water away from contact with coffee grounds in the holder.

4. An automatic coffee brewer according to claim 1, wherein said means for dispensing hot water comprises a conduit leading from the upper portion of said water tank to a discharge outlet above the grounds holder, said bypass means being a stream divider valve device inserted in said conduit and having an inlet passage and two outlet passages, each of smaller size than the inlet passage, one of said outlet passages leading to said discharge outlet and other leading to a discharge position so located as to prevent hot water being discharged therefrom to contact grounds in said holder.

5. An automatic coffee brewer according to claim 4, wherein said stream divider valve device inlet passage has an area equal to the sum of the areas of said two outlet passages and said one outlet passage has approximately a 50% greater cross-sectional area than the other outlet passage.

6. An automatic coffee brewer according to claim 4, wherein said holder for coffee grounds comprises a generally conical-shaped outer container and a removable conical-shaped spider for supporting a filter and coffee grounds, the conical side wall surfaces of the spider being completely spaced inwardly from the corresponding conical side wall surfaces of said outer container, the discharge position of said other outlet passage of the stream divider valve device being directly above the space separating the said spider from the outer container of the grounds holder.

7. An automatic coffee brewer according to claim 5, wherein a manifold passage connects said input and outlet passages, said manifold passage being closed by a removable plug whose removal permits cleaning of the stream divider valve device.

8. An automatic coffee brewer according to claim 1, wherein said beaker is a thermal insulating vessel which avoids the need for heating the brewed coffee discharged thereto.

9. An automatic coffee brewer according to claim 1, wherein is additionally provided means for feeding said predetermined amount of water to said tank for heating, said water feeding means including an open topped tray having a bottom sloping to a discharge outlet positioned above the water tank, whereby said predetermined amount of water may be manually poured into said tray for feeding into said water tank.

* * * * *